United States Patent
Chandrasekaran et al.

(10) Patent No.: US 11,232,189 B2
(45) Date of Patent: Jan. 25, 2022

(54) SYSTEM AND METHOD FOR TRACKING AND AUTHENTICATING CODE TRANSITION DURING PHASES OF DEVELOPMENT AND DEPLOYMENT

(71) Applicant: Cognizant Technology Solutions India Pvt. Ltd., Chennai (IN)

(72) Inventors: Rajkumar Chandrasekaran, Chennai (IN); Karthikeyan Vedagiri, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 797 days.

(21) Appl. No.: 16/114,395

(22) Filed: Aug. 28, 2018

(65) Prior Publication Data

US 2020/0012779 A1    Jan. 9, 2020

(30) Foreign Application Priority Data

Jul. 6, 2018   (IN) .............................. 201841025295

(51) Int. Cl.
  *G06F 8/60*    (2018.01)
  *G06F 21/44*   (2013.01)

(52) U.S. Cl.
  CPC .............. *G06F 21/44* (2013.01); *G06F 8/60* (2013.01); *G06F 2221/2101* (2013.01)

(58) Field of Classification Search
  CPC ..... G06F 8/60; G06F 8/70; G06F 8/20; G06F 11/3409; G06F 11/3664; G06F 11/3668; G06F 2221/2101; G06F 21/44; G06F 2221/033; G06F 21/50; G06F 21/64; H04L 2209/38; G06Q 10/101; G01R 31/31835

See application file for complete search history.

(56) References Cited

U.S. PATENT DOCUMENTS

2019/0236548 A1* 8/2019 Singi .................... G07G 1/0009

OTHER PUBLICATIONS

"Blockchain in DevOps Implementing Transparent Continuous Delivery", 2017, Internet: URL http://www.ey.com/ca/en/services/advisory/it/blockchain-in-devops.

(Continued)

*Primary Examiner* — Brian F Shaw
(74) *Attorney, Agent, or Firm* — Cantor Colburn LLP

(57) ABSTRACT

A system and method for tracking and authenticating software code transition during various phases of software development and deployment in a DevOps platform is provided. The present invention provides for creating, modifying and deleting one or more code authentication elements including respective policies within a distributed ledger. The code authentication elements are mapped with one or more event types in respective one or more tools of a DevOps platform. Information associated with occurrence of an event in one or more tools of the DevOps platform are retrieved. The retrieved event information is parsed to extract event type and a code authentication element is invoked based on the identified event type. The invoked code authentication element authenticates software code transition to appropriate tool of DevOps platform based on one more defined policies. A result representative of authentication success or failure is stored in the distributed ledger for tracking and auditing.

28 Claims, 6 Drawing Sheets

(56) References Cited

OTHER PUBLICATIONS

Andy Cureton "Adopting Blockchain: How a DevOps Approach Can Help", Jul. 17, 2017, Internet: URL: https://dzone.com/articles/adopting-blockchain-how-a-devops-approach-can-help.
Chris Tozzi, "How Blockchain Tech Can Make DevOps Better", Dec. 12, 2017,Internet: URL: https://devops.com/blockchain-make-devops-better/.
David Burela, "Blockchain DevOps with Redback Technologies", May 12, 2017, Internet: URL: https://microsoftapac.github.io/redback-devops.html.

* cited by examiner

SYSTEM AND METHOD FOR TRACKING AND AUTHENTICATING CODE TRANSITION DURING PHASES OF DEVELOPMENT AND DEPLOYMENT

CROSS REFERENCE TO RELATED APPLICATION

This application is related to and claims the benefit of Indian Patent Application Number 201841025295 filed on Jul. 6, 2018, the contents of which are herein incorporated by reference in their entirety.

FIELD OF THE INVENTION

The present invention relates generally to the field of software development and deployment. More particularly, the present invention relates to a system and a method for tracking and authenticating code transition during one or more phases of software development and deployment.

BACKGROUND OF THE INVENTION

Development and deployment of software applications is progressively becoming complex, fast-paced and critical for success of businesses. Enterprises are required to build, test and deploy new versions of software applications with increasing frequency while maintaining 24×7 operations. To meet the aforementioned requirements of quickly designing, building, testing, deploying, and maintaining software applications, enterprises are adopting Development Operations (or DevOps) practices.

DevOps is a software development method that stresses on communication, collaboration, integration, automation and measurement of cooperation between software developers and other information-technology (IT) professionals.

DevOps acknowledges interdependence of software development, quality assurance, and IT operations, and aims to help an organization to rapidly produce software products and services and to improve reliability and security while providing faster development and deployment cycles. DevOps accomplishes this by facilitating continuous integration and continuous delivery, resulting in faster release lifecycles without compromising on application quality.

Adoption of DevOps practices is relatively high and advanced in certain enterprises like internet, retail, media, and technology. However, for regulated enterprises such as life sciences, healthcare and financial services adoption of DevOps is sporadic and low. Enterprises in the regulated industries often see compliance as the highest priority and mandate, often delaying software delivery automation and DevOps practices. Additionally, software delivery in regulated industries have to comply with a host of regulatory guidelines that makes enterprise automation and DevOps transformation extremely challenging with existing set of tools and technologies. Moreover, implementing DevOps in regulated environment to ensure validation of changes in software code and tracking of changes in said code during various phases of development is a challenging task. Further, providing transparency in the audit trail of one or more events associated with various phases of software delivery is an intricate task. Furthermore, compliance that governs safe, transparent and secure way of holding the system of records for auditing are regulator specific processes.

In light of the above drawbacks, there is a need for a system and a method which can be easily integrated with a DevOps platform and is capable of accelerating software delivery. There is a need for a system and a method which complies with regulatory and audit requirements of enterprises. There is a need for a system and a method where risk-based controls and processes are clearly enforced and recorded in an audit trail. There is a need for a system and a method which is capable of detecting, tracking and authenticating code transition during one or more phases of software development and deployment to appropriate phases of development and deployment. Further, there is a need for a system and a method which is capable of maintaining a tamper resistant, traceable and transparent record of one or more changes occurring during one or more phases of software development and deployment. Yet further, there is also a need for a system and a method which is cost effective and provides superior performance.

SUMMARY OF THE INVENTION

A method for tracking and authenticating software code transition during one or more phases of software development and deployment in a DevOps platform is provided. In various embodiments of the present invention, the method is implemented by at least one processor executing program instructions stored in a memory. The method comprises extracting, by a processor, an event type data from the information associated with occurrence of an event in a tool of the DevOps platform. The method further comprises determining, by the processor, a code authentication element associated with the extracted event type. The code authentication element is implemented within a distributed ledger. The code authentication element is determined based on a mapping of one or more code authentication elements with one or more event types associated with one or more tools of the DevOps platform stored in an event-contract database. Further, the method comprises invoking, by the processor, the determined code authentication element to authenticate transition of a software code associated with the extracted event type to an appropriate tool of the DevOps platform. Furthermore, the method comprises executing, by the processor, the software code transition based on the result of the authentication. The method comprises executing the software code transition to the appropriate tool of the DevOps platform if a result of an authentication process is inline with a policy defined within the code authentication element. Yet further, the method comprises preventing the software code transition to the appropriate tool of the DevOps platform if the result of the authentication process is not inline with the policy defined within the code authentication element. Finally, the method comprises, storing the result of the authentication process and the software code transition in the distributed ledger for querying and auditing.

A system for tracking and authenticating software code transition during one or more phases of software development and deployment in a DevOps platform is provided. In various embodiments of the present invention, the system interfaces with the DevOps platform and one or more terminal devices. The system comprises a memory storing program instructions, a processor configured to execute program instructions stored in the memory, and an application delivery engine in communication with the processor. The system is configured to extract an event type data from the information associated with occurrence of an event in a tool of the DevOps platform. The system is configured to determine a code authentication element associated with the extracted event type. The code authentication element is implemented within a distributed ledge. The code authentication element is determined based on a mapping of one or more code authentication elements with one or more event types associated with one or more tools of the DevOps platform stored in an event-contract database. Further, the system invokes the determined code authentication element to authenticate transition of a software code associated with the extracted event type to an appropriate tool of the DevOps platform. Furthermore, the system executes software code transition based on the result of the authentication. The system, executes the software code transition to the appropriate tool of the DevOps platform if the result of the authentication process is inline with the defined policy. Further, the system prevents the software code transition to the appropriate tool of the DevOps platform if the result of the authentication process is not inline with the policy defined within the code authentication element. Finally, the system stores the result of the authentication process and the software code transition in the distributed ledger for querying and auditing.

A computer program product is provided. The computer program product comprises a non-transitory computer-readable medium having computer-readable program code stored thereon, the computer-readable program code comprising instructions that, when executed by a processor, cause the processor to extract an event type data from the information associated with occurrence of an event in a tool of the DevOps platform. Further, a code authentication element associated with the extracted event type is determined. The code authentication element is implemented within a distributed ledge. The code authentication element is determined based on a mapping of one or more code authentication elements with one or more event types associated with one or more tools of the DevOps platform stored in an event-contract database. Further, the determined code authentication element is invoked to authenticate transition of a software code associated with the extracted event type to an appropriate tool of the DevOps platform. Furthermore, the software code transition is executed based on the result of the authentication. The software code transition to the appropriate tool of the DevOps platform is executed if the result of the authentication process is inline with the defined policy. Further, the software code transition to the appropriate tool of the DevOps platform is prevented if the result of the authentication process is not inline with the policy defined within the code authentication element. Finally, the result of the authentication process and the software code transition are stored in the distributed ledger for querying and auditing.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
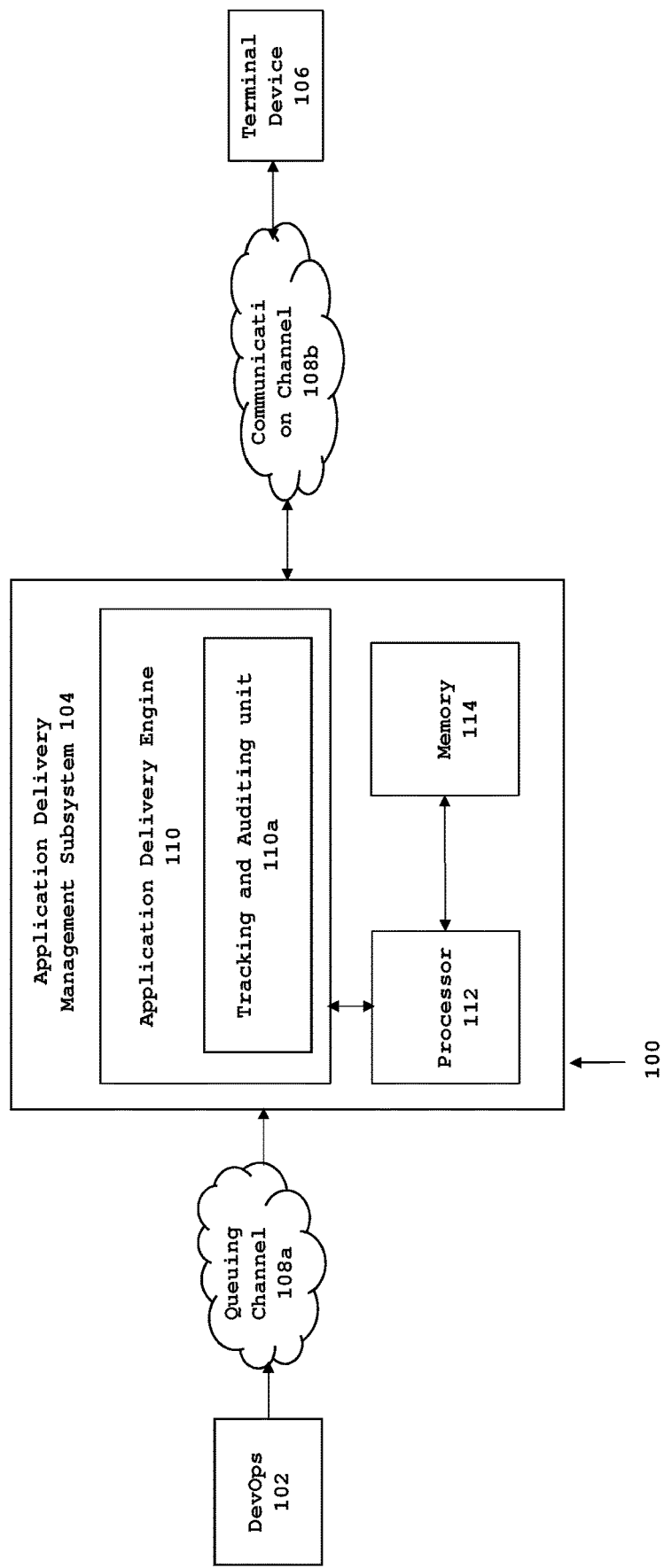
FIG. 1 illustrates a block diagram of a system for tracking and authenticating software code transition during one or more phases of software development and deployment in a DevOps platform, in accordance with various embodiments of the present invention.

The present invention discloses a system and a method for tracking and authenticating software code transition during one or more phases of software development and deployment in a DevOps platform. In particular, the present invention provides for creating one or more code authentication elements including respective policies within a distributed ledger and modifying policies defined within respective code authentication elements. The present invention, further provides for mapping each of the one or more code authentication elements to be executed on occurrence of corresponding one or more event types in respective one or more tools of a DevOps platform. Each code authentication element is representative of an authentication process and an action to be executed within corresponding tool of DevOps platform after authentication. Further, the system and the method of the present invention, provides for retrieving information associated with occurrence of an event in one or more tools of the DevOps platform, respectively. Each tool in DevOps platform is associated with one or more phases of software development and deployment. The retrieved event information is parsed to extract data including, but not limited to event type, event time, user initiating the event, associated tool etc. Subsequently, a code authentication element is invoked based on the identified event type. The invoked code authentication element performs the authentication process on a software code and/or artifact under development to validate code and/or artifact transition to appropriate tool of DevOps platform based on one more defined policies. A result representative of authentication success or failure is stored in the distributed ledger. Yet further, the system and method of the present invention, provides for analyzing code and/or artifact transition on occurrence of an event in one or more tools of the DevOps platform, respectively. The present invention facilitates traceability and auditability to detect any anomalous behaviour during one or more phases of software development and deployment, thereby, ensuring adherence to one or more policies of software development.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a block diagram of a system for tracking and authenticating software code transition during one or more phases of software development and deployment in a DevOps platform, in accordance with various embodiments of the present invention.

Referring to FIG. 1, in an embodiment of the present invention, the system 100 comprises a DevOps platform 102, an application delivery management subsystem 104 and a terminal device 106.

Figure 1A:
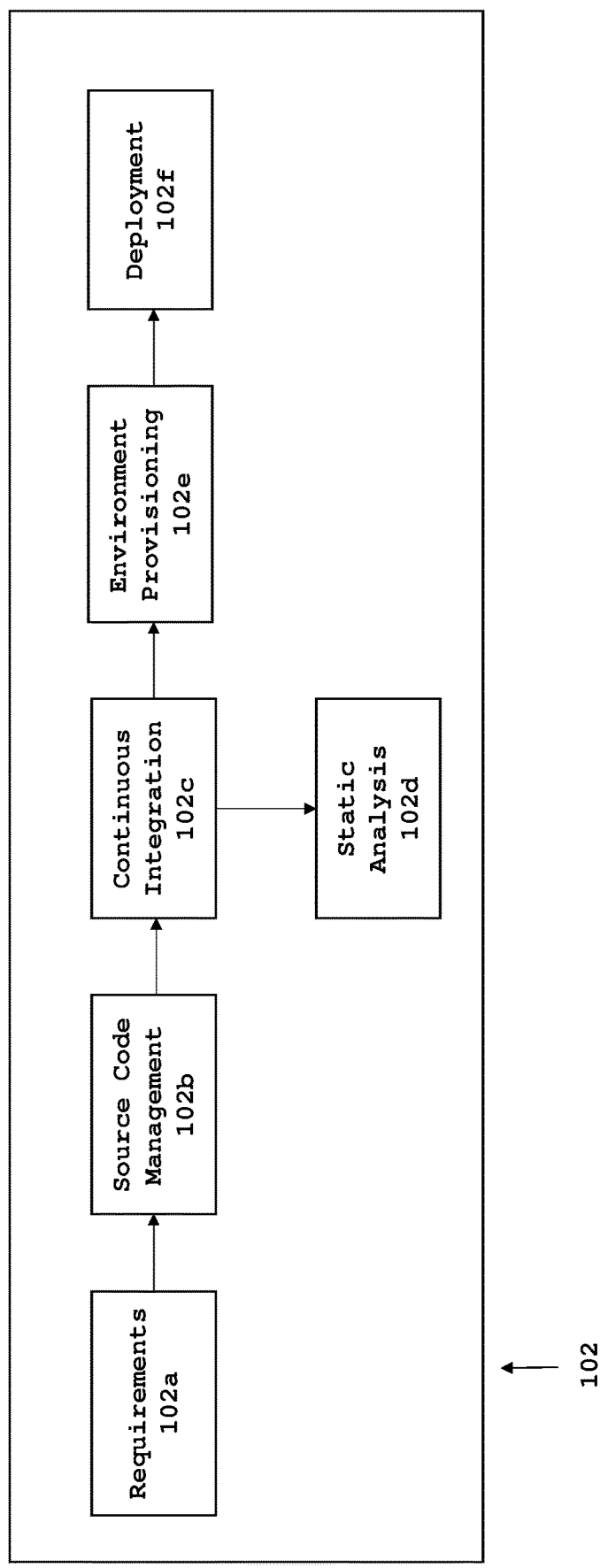
FIG. 1a illustrates a block diagram of a plurality of tools of a DevOps platform, in accordance with an embodiment of the present invention.

In various embodiments of the present invention, the DevOps platform 102 comprises a plurality of tools which are integrated to each other to complete one or more phases of software development and deployment. Each tool in the DevOps platform 102 is associated with one or more phases of software development and deployment. The phrase software development and deployment is representative of software code buildup and software code transition as built artifacts through one or more tools of the DevOps platform 102. The term code transition is representative of a state change and progress of the software code from one tool of the DevOps platform 102 to another tool. In an exemplary embodiment of the present invention as shown in FIG. 1a, the DevOps platform 102 includes the following tools a Requirement tool 102a, a Source code management (SCM) tool 102b, Continuous integration (CI) tool 102c, a Static code analysis tool 102d, an Environment Provisioning tool 102e, and a Deployment tool 102f. Examples of some of the above-mentioned tools along with other exemplary tools are listed in Table 1 below:

| S. No. | Tool | Examples |
| --- | --- | --- |
| 1 | Requirements | JIRA, Agile Central, Pivotal Tracker |
| 2 | SCM | Git, SVN |
| 3 | CI | Jenkins, TFS, Bamboo |
| 4 | Code Review | Collaborator, Crucible |
| 5 | Static Analysis | Sonar, CAST, |
| 6 | Functional Automation | Selenium, QTP |
| 7 | Artifact Repo | Nexus, Artifactory |
| 8 | Package Repo | Yum |
| 9 | ITSM | SNOW, JIRA |
| 10 | Deployment Automation | Rundeck, XLDeploy, UDeploy |
| 11 | Configuration Automation | Chef, Puppet, Ansible. |
| 12 | DB Versioning | DBMaestro, Liquibase |
| 13 | Provisioning | VMware, Openstack |
| 14 | Release Planning | XLRelease, uRelease |
| 15 | App Monitoring | Splunk, Dynatrace |

In various exemplary embodiments of the present invention, the terminal device 106 may include but is not limited to a smart phone, a computer, a tablet, a microcomputer or any other wired or wireless processing device. In an embodiment of the present invention, the terminal device 106 may be configured to interact with the application delivery management subsystem 104 to create one or more code authentication elements within a distributed ledger, modify policies defined within respective code authentication elements, map a code authentication element to be executed on occurrence of a particular event type in respective tools of the DevOps platform, detect and analyze code transition during one or more events associated with one or more tools of the DevOps platform 102.

In an exemplary embodiment of the present invention, as shown in FIG. 1, the application delivery management subsystem 104 interfaces with the DevOps platform 102 and a terminal device 106. The application delivery management subsystem 104 retrieves information associated with occurrence of an event in one or more tools of DevOps platform 102, respectively via a queuing channel 108a. The application delivery management subsystem 104 analyses, processes, parses and extracts data from the retrieved information, executes associated code authentication elements, performs authentication, stores authentication results and outputs the results to the terminal device 106. The application delivery management subsystem 104 interfaces with the terminal device 106 over a communication channel 108a. Further, the communication channel 108 may include a physical transmission medium, such as, a wire, or a logical connection over a multiplexed medium, such as, a radio channel in telecommunications and computer networking. The examples of radio channel in telecommunications and computer networking may include, but are not limited to a Local Area Network (LAN), a Metropolitan Area Network (MAN), and a Wide Area Network (WAN).

Further, the application delivery management subsystem 104 comprises an application delivery engine 110, a processor 112 and a memory 114. The application delivery engine 110 is configured to automatically retrieve, extract and analyze complex event data, create and manage code authentication elements, authenticate software code transition, and maintain a record of each event and state change in a distributed ledger.

In various embodiments of the present invention, the application delivery engine 110 is configured to create one or more code authentication elements within a distributed ledger. Each code authentication element is representative of an authentication process and an action to be executed within corresponding tools of DevOps platform 102 after the authentication process. Each code authentication element comprises one or more policies, where each policy is representative of a set of conditions which should be attained for successful authentication. In an exemplary embodiment of the present invention, each code authentication element may be implemented as a smart contract. The code authentication element may be deployed as chain code within the distributed ledger. In an embodiment of the present invention, the distributed ledger is a blockchain ledger. In an exemplary embodiment of the present invention, a standard distributed open source ledger for instance, Hyperledger Fabric is integrated with the application delivery engine 110. In various embodiments of the present invention, the application delivery management subsystem 104 may be implemented with any distributed and decentralized ledger.

The application delivery engine 110 maps respective code authentication elements with one or more event types occurring in respective one or more tools of the DevOps platform 102. In an exemplary embodiment of the present invention, each policy within respective code authentication element is mapped with an event type. As already described in paragraph 25, each policy is representative of a set of conditions which should be attained for successful authentication of the software code build up during an event type. A code authentication element is executed on occurrence of the one or more event types. A policy within a code authentication element is executed to authenticate corresponding event type. In an example, the event types are code check-in and clear review of code check-in in the tool SCM 102b of the DevOps platform. The two event types are mapped with a code authentication element. The code authentication element comprises one or more policies, where a first policy includes a first set of conditions to authenticate code check-in and a second policy includes a second set of conditions to authenticate clear review of code check-in. The code authentication element defines the entry and exit criteria between one or more tools of the DevOps platform 102. The one or more code authentication elements ensure that the software code built up in one tool of DevOps platform 102 transitions to appropriate tool of said platform 102 only if the conditions specified within the respective policy of the respective code authentication elements are satisfied. An example of the policy defined within the code authentication element may include, but is not limited to continuous integration tool (102c) triggers deployment only if result of static code analysis tool (102d) and code coverage percentage are above the threshold values defined within the policy. The application delivery engine 110, maintains a database of one or more code authentication elements mapped with corresponding one or more event types in a local data storage (not shown) hereinafter referred to as event-contract database.

Further, the application delivery engine 110 facilitates the modification of one or more policies defined within respective code authentication elements via the terminal device 106. In an exemplary embodiment of the present invention, the created code authentication elements can be edited or deleted by one or more developers via the terminal device 106. In an exemplary embodiment of the present invention, the code authentication element is a smart contract, deployed as chain code within the distributed ledger.

In another exemplary embodiment of the present invention, a developer may define, edit and delete code authentication elements by accessing the application delivery engine 110 via a terminal device 106 through a web portal.

Further, the application delivery engine 110, retrieves information associated with occurrence of an event in one or more tools of the DevOps platform 102, respectively via a queuing channel 108a. The examples of the queuing channel may include but are not limited to message queue tools such as RabbitMQ. The retrieved information is parsed to extract data including but not limited to event type, event time, user initiating the event, associated tool where event is initiated etc.

The application delivery engine 110 determines the code authentication element to be invoked from the event-contract database (as already described in paragraph 26) based on the identified event type. As already described in para 25, each code authentication element is representative of an authentication process and an action to be executed within corresponding tools of DevOps platform 102 after the authentication process. Each code authentication element comprises one or more policies, where each policy is representative of a set of conditions which should be attained for successful authentication of the software code built up during the event type. The invoked code authentication element performs the authentication process on the software code under development during occurrence of the identified event type to validate code transition to subsequent tool of DevOps platform based on the policy associated with the event type. The application delivery engine 110 determines if the result of the authentication process is inline with a policy defined within the code authentication element. If the result is inline with the defined policy then the software code transition to the subsequent tool is authorized and the code is prepared for transition. If the result of the authentication process is not inline with the policy defined within the code authentication element, the code transition is prevented and a notification is sent to the terminal device 106. As already explained above, the code transition from one tool of the DevOps platform 102 to another tool is representative of a state change.

Each tool in DevOps platform 102 is associated with one or more phases of software development and deployment, thereby the one or more code authentication elements ensure that a phase of software development and deployment does not proceed to subsequent phase until the set of conditions defined in the corresponding policy are attained. Example of the set of conditions defined within the policy may include, but is not limited to code commit is allowed if two or more people vote for code commit. Other instances such as CI integration to not skip code quality checks, code coverage target has to be met etc. may be enforced using contract policy.

Subsequent, to the authentication process the application delivery engine 110 stores the result of the authentication process in the distributed ledger. The stored results are available for querying and auditing purposes in future. In an embodiment of the present invention, the application delivery engine 110 comprises a tracking and auditing unit 110a. The tracking and auditing unit 110a, audits and tracks authentication results and state changes stored in the blockchain ledger. In an exemplary embodiment of the present invention, the tracking and auditing unit 110a, may perform auditing and tracking based on one or more parameters. In an exemplary embodiment of the present invention, the one or more parameters may include, but are not limited to time period i.e. start date and end date, event type, DevOps tool name or phase of software development and deployment, and artifacts such as Change Requests, User stories, Defects listed alongside DevOps tools. The tracking and auditing unit 110a may perform a detailed search of each of the phase or event to trace the related events to view associated metadata like user who triggered it, time stamp, etc. in response to auditor queries received via the terminal device 206. The audit-results are displayed on the terminal device 106.

In another embodiment of the present invention, the application delivery management subsystem 104 may be implemented in a cloud computing architecture in which data, applications, services, and other resources are stored and delivered through shared data-centers. In an exemplary embodiment of the present invention, the functionalities of the application delivery management subsystem 104 are delivered to the terminal device 106 as software as a service (SAAS) over the communication network 108b.

In another embodiment of the present invention, the application delivery management subsystem 104 may be implemented as a client-server architecture, wherein the terminal device 106 accesses a server hosting the subsystem 104 over a communication network 108b.

In yet another embodiment of the present invention the application delivery management subsystem 104 may be accessed through a web address via the terminal device 106.

Figure 2:
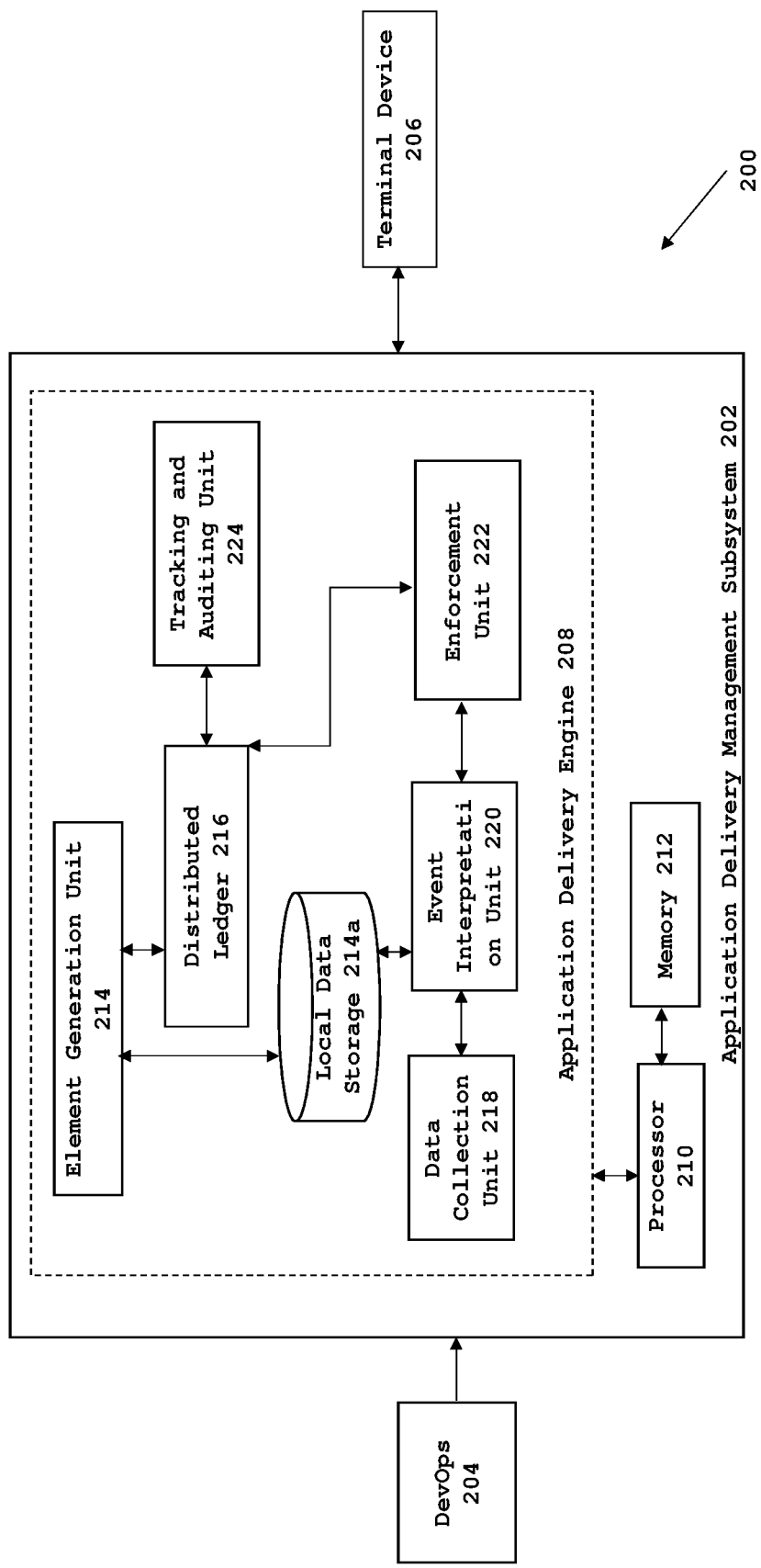
FIG. 2 is a detailed block diagram of a system for tracking and authenticating software code transition during one or more phases of software development and deployment in a DevOps platform, in accordance with various embodiments of the present invention.

FIG. 2 is a detailed block diagram of a system for tracking and authenticating software code transition during one or more phases of software development and deployment in a DevOps platform, in accordance with various embodiments of the present invention. The application delivery management subsystem 202 interfaces with the DevOps platform 204 to retrieve information associated with occurrence of one or more events in one or more tools of the DevOps platform 204. The application delivery management subsystem 202 analyses, processes, parses and extracts data from the retrieved information, executes associated code authentication elements, performs authentication, stores authentication results and outputs the results to a terminal device 206. The application delivery management subsystem 204 comprises an application delivery engine 208, a processor 210 and a memory 212.

In various embodiments of the present invention, the application delivery engine 208 has multiple units which work in conjunction with each other for tracking and authenticating code transition during one or more phases of software development and deployment in the DevOps platform 204. The various units of the application delivery engine 208 are operated via the processor 210 specifically programmed to execute instructions stored in the memory 212 for executing respective functionalities of the units of the subsystem 202 in accordance with various embodiments of the present invention.

In an embodiment of the present invention, the application delivery engine 208 comprises an element generation unit 214, a local data storage 214a, a distributed ledger 216, a data collection unit 218, an event interpretation unit 220, a enforcement unit 222 and a tracking and auditing unit 224.

The element generation unit 214 is configured to create one or more code authentication elements within the distributed ledger 216. Each code authentication element is representative of an authentication process and an action to be executed within corresponding tools of DevOps platform 204 after the authentication process. Each code authentication element comprises one or more policies, where each policy is representative of a set of conditions which should be attained for successful authentication. In an exemplary embodiment of the present invention, each code authentication element is deployed as chain code within the distributed ledger 216. In an embodiment of the present invention, the distributed ledger 216 is a blockchain ledger. In an exemplary embodiment of the present invention, a standard distributed open source ledger for instance, Hyperledger Fabric is integrated with the application delivery engine 208. In various embodiments of the present invention, the application delivery management subsystem 202 may be implemented with any distributed and decentralized ledger.

Further, the element generation unit 214 maps respective code authentication elements with one or more event types occurring in respective one or more tools of the DevOps platform 204. In an exemplary embodiment of the present invention, each policy within respective code authentication element is mapped with an event type. As already described in paragraph 25, each policy is representative of a set of conditions which should be attained for successful authentication of the software code build up during an event type. A code authentication element is executed on occurrence of the one or more event types. A policy within a code authentication element is executed to authenticate corresponding event type. For instance the event types are code check-in and clear review of code check-in in a SCM tool of the DevOps platform 204. The two event types are mapped with a code authentication element. The code authentication element comprises one or more policies, where a first policy includes a first set of conditions to authenticate code check-in and a second policy includes a second set of conditions to authenticate clear review of code check-in. The code authentication element defines the entry and exit criteria between one or more tools of the DevOps platform 204. The one or more code authentication elements ensure that the software code being developed transitions to subsequent tool only if the conditions specified within the respective policy of the respective code authentication elements are satisfied. An example of the policy defined within the code authentication element may include, but is not limited to continuous integration tool (102c FIG. 1a) triggers deployment only if result of static code analysis tool (102d FIG. 1a) and code coverage percentage are above the threshold values defined within the policy. The element generation unit 214, maintains a database of one or more code authentication elements mapped with corresponding one or more event types in the local data storage (214a) hereinafter referred to as event-contract database.

Further, the element generation unit 214 facilitates the modification of one or more policies defined within respective code authentication elements via the terminal device 206. In an exemplary embodiment of the present invention, the created code authentication elements can be edited or deleted by one or more developers via the terminal device 206. In an exemplary embodiment of the present invention, the code authentication elements are deployed as chain code within the distributed ledger 216.

In an embodiment of the present invention, the data collection unit 218, retrieves information associated with occurrence of an event in one or more tools of the DevOps platform 204, respectively via a queuing channel 108a of FIG. 1. The examples of the queuing channel may include but are not limited to message queue tools such as RabbitMQ. The data collection unit 218 parses the retrieved information to extract data such as event type, event time, user initiating the event, associated tool where event is initiated etc.

The event interpretation unit 220 is configured to receive the parsed information from the data collection unit 218. The event interpretation unit 220 determines the code authentication element to be invoked from the event-contract database maintained in the local data storage 214a based on the identified event type. As already described above in para 37, each code authentication element is representative of an authentication process and an action to be executed within corresponding tools of DevOps platform 204 after the authentication process. Each code authentication element comprises one or more policies, where each policy is representative of a set of conditions which should be attained for successful authentication of the software code build up during the event type.

The enforcement unit 222 is configured to receive the code authentication element information as determined by the event interpretation unit 220. The enforcement unit 222 invokes the code authentication element and enforces policies defined within the code authentication element. The invoked code authentication element performs the authentication process on the software code under development during occurrence of the identified event type to validate code transition to subsequent tool of DevOps platform 204 based on the policy associated with the event type. The enforcement unit 222 determines if the result of the authentication process is inline with a policy defined within the code authentication element. If the result is inline with the defined policy then the software code transition to the subsequent tool is authorized and the code is prepared for transition. If the result of the authentication process is not inline with the policy defined within the code authentication element, the code transition is prevented and a notification is sent to the terminal device 206. As already explained above, the code transition from one tool of the DevOps platform 204 to another tool is representative of a state change.

The enforcement unit 222 is configured to ensure that a phase of software delivery and deployment does not proceed to subsequent phase until the set of conditions defined in the corresponding policy of the invoked code authentication element are attained. Example of the set of conditions defined within the policy may include, but is not limited to code commit is allowed if two or more people vote for code commit. Other instances such as CI integration should not skip code quality checks, code coverage target has to be met etc. may be enforced using contract policy.

Subsequent, to the authentication process the enforcement unit 222 stores the result of the authentication process in the distributed ledger 216. The stored results are available for querying and auditing purposes by the tracking and auditing unit 224.

The tracking and auditing unit 224 is configured to audit and track authentication results and state changes associated with code transition stored in the distributed ledger 216. In an embodiment of the present invention, the tracking and auditing unit 224, may perform auditing and tracking based on one or more parameters. The one or more parameters may include, but are not limited to time period i.e. start date and end date, event type, DevOps tool name or phase of software development and deployment, and artifacts such as Change Requests, User stories, Defects listed alongside DevOps tools. The tracking and auditing unit 224 can perform a detailed search of each of the phase or event to trace the related events to view associated metadata like user who triggered it, time stamp, etc. in response to auditor queries received via the terminal device 206. The audit-results are displayed on the terminal device 206. An example of the audit results is shown in table 2 below:
Results At step 304, a code authentication elements is mapped with one or more event types and stored in a local data storage. In particular, respective code authentication elements are mapped with one or more event types occurring in respective one or more tools of the DevOps platform 102. In an exemplary embodiment of the present invention, each policy within respective code authentication element is mapped with an event type. As already described above, each policy is representative of a set of conditions which should be attained for successful authentication of the software code build up during an event type. A code authentication element is executed on occurrence of the one or more event types. A policy within a code authentication element is executed to authenticate corresponding event type. For instance the event types are code check-in and clear review of code check-in in the tool SCM of the DevOps platform. The two event types are mapped with a code authentication element. The code authentication element comprises one or more policies, where a first policy includes a first set of conditions to authenticate code check-in and a second policy includes a second set of conditions to authenticate clear review of code check-in. The code authentication element defines the entry and exit criteria between one or more tools of the DevOps platform. The one or more code authentication elements ensure that the software code being developed transitions to subsequent tool only if the conditions specified within the respective policy of the respective code authentication elements are satisfied. An example of the policy defined within the code authentication element may include,

| Results displayed from Date: {DD/MM/YY}-{DD/MM/YY} for | | | | | Total records found 15 | |
|---|---|---|---|---|---|---|
| {PROJECT} for {KEYWORDS} | | | | | Measure & | |
| Date | Build | Deploy | Verify | Release | Monitor | Environment |
| Date 1 | Result displayed | | Result displayed | Result displayed | Result displayed | Result displayed |
| Date 2 | Result displayed | Result displayed | Result displayed | Result displayed | Result displayed | |
| Date 3 | Result displayed | Result displayed | | | Result displayed | Result displayed |
| Date 4 | | Result displayed | Result displayed | Result displayed | Result displayed | Result displayed |
| Date 5 | Result displayed | Result displayed | Result displayed | Result displayed | Result displayed | Result displayed Page 1 of 3 <Next> |

Figure 3:
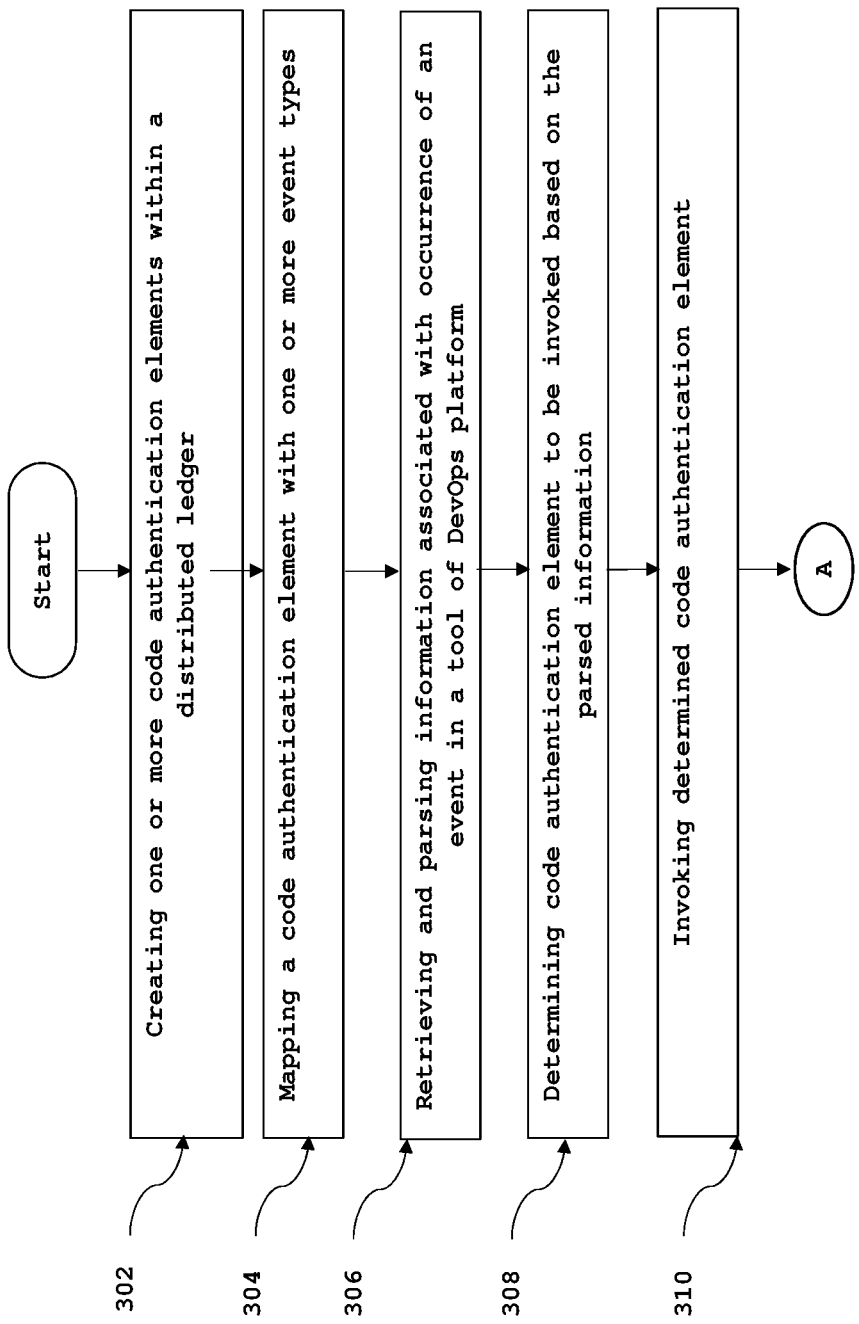
FIG. 3 is a flowchart illustrating a method for tracking and authenticating software code transition during one or more phases of software development and deployment in a DevOps platform, in accordance with various embodiments of the present invention.
Figure 3:
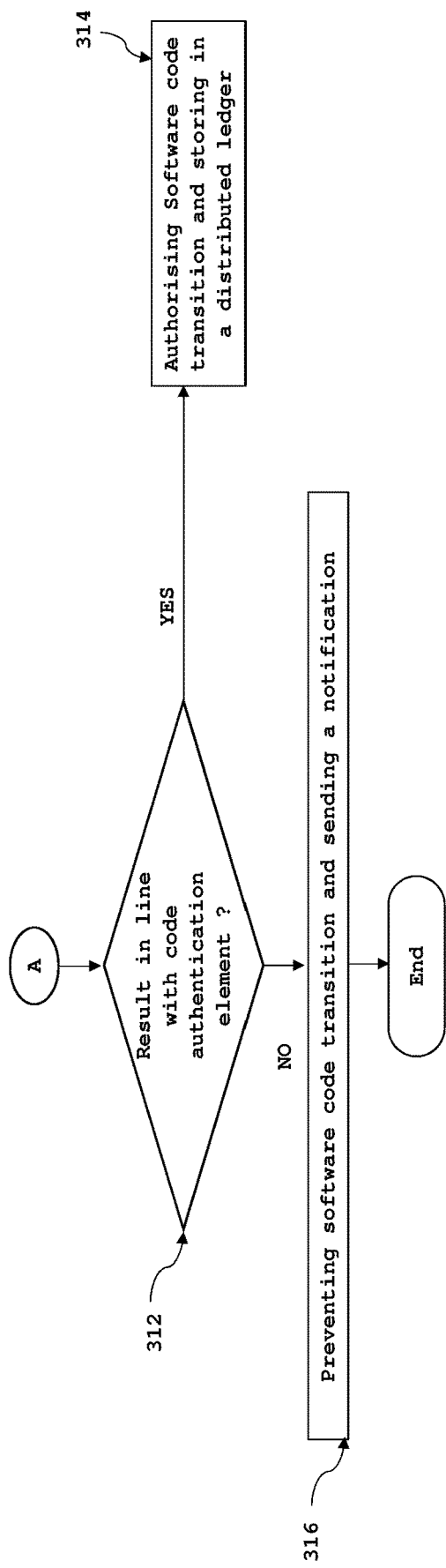

FIG. 3 is a flowchart illustrating a method for tracking and authenticating software code transition during one or more phases of software development and deployment in a DevOps platform, in accordance with various embodiments of the present invention.

At step 302, one or more code authentication elements are created within a distributed ledger. In an embodiment of the present invention, each code authentication element is representative of an authentication process and an action to be executed within corresponding tools of DevOps platform 102 after the authentication process. Each code authentication element comprises one or more policies, where each policy is representative of a set of conditions which should be attained for successful authentication of software code build up during an event type. In an exemplary embodiment of the present invention, each code authentication element is implemented as a smart contract. The code authentication element is deployed as chain code within the distributed ledger. In an embodiment of the present invention, the distributed ledger is a blockchain ledger.

but is not limited to continuous integration tool triggers deployment only if result of static code analysis tool and code coverage percentage are above the threshold values defined within the policy. A database of one or more code authentication elements mapped with corresponding one or more event types is maintained in a local data storage hereinafter referred to as event-contract database.

At step 306, information associated with occurrence of an event in a tool of DevOps platform is retrieved and parsed. In an embodiment of the present invention, information associated with occurrence of one or more events in one or more tools of the DevOps platform, respectively is retrieved via a queuing channel. The examples of the queuing channel may include but are not limited to message queue tools such as RabbitMQ. The retrieved information is parsed to extract data such as event type, event time, user initiating the event, associated tool where event is initiated etc.

At step 308, code authentication element to be invoked is determined based on the parsed information. In an embodiment of the present invention, the code authentication element to be invoked is determined from the event-contract database maintained in the local data storage based on the identified event type. As already described above, each code authentication element is representative of an authentication process and an action to be executed within corresponding tools of the DevOps platform after the authentication process. Each code authentication element comprises one or more policies, where each policy is representative of a set of conditions which should be attained for successful authentication of the software code build up during the event type.

At step 310, determined code authentication element is invoked. In an embodiment of the present invention, the determined code authentication element is invoked and policies defined within the code authentication element are enforced. The invoked code authentication element performs the authentication process on the software code built up during occurrence of the identified event type to validate code transition from one tool to another appropriate tool of the DevOps platform based on the policy associated with the event type.

At step 312, a check is performed to determine, if the result of the authentication process is inline with a policy defined within the code authentication element. At step 314, if the result of the authentication process is inline with the defined policy then the software code transition to the subsequent tool is authorized and the code is prepared for transition. The state change is stored in the distributed ledger and is available for querying and auditing purposes. As already explained above, the code transition from one tool of the DevOps platform to another tool is representative of state change.

At step 316, if the result of the authentication process is not inline with the policy defined within the code authentication element, the code transition is prevented and a notification is sent to the terminal device. This ensures adherence to one or more policies of DevOps platform.

Figure 4:
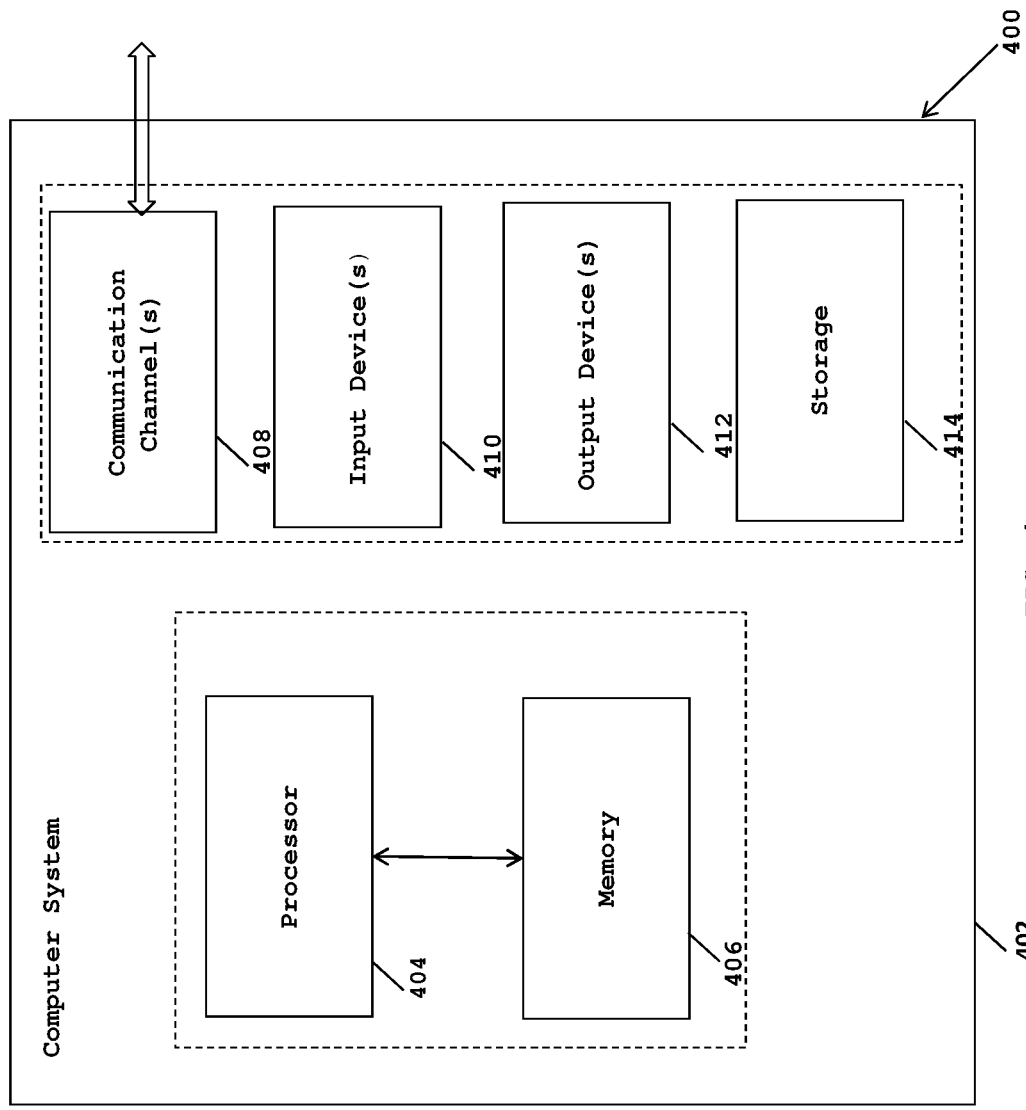
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for tracking and authenticating software code transition during one or more phases of software development and deployment in a DevOps platform, wherein the method is implemented by at least one processor executing program instructions stored in a memory, the method comprising:

creating, modifying and deleting, by a processor, one or more code authentication elements within a distributed ledger;

mapping, by the processor, the one or more created or modified code authentication elements with one or more event types occurring in respective one or more tools of the DevOps platform to create an event-contract database;

extracting, by the processor, an event type data from information associated with occurrence of an event in a tool of the DevOps platform;

determining, by the processor, a code authentication element associated with the extracted event type from the one or more code authentication elements within the distributed ledger based on the mapping of the one or more code authentication elements with the one or more event types associated with the one or more tools of the DevOps platform stored in the event-contract database;

invoking, by the processor, the determined code authentication element to authenticate transition of a software code associated with the extracted event type to an appropriate tool of the DevOps platform; and executing software code transition based on the result of the authentication.

2. The method as claimed in claim 1, wherein the software code transition to the appropriate tool of the DevOps platform is executed if a result of an authentication process is inline with a policy defined within the code authentication element.

3. The method as claimed in claim 2, wherein the software code transition is prevented to the appropriate tool of the DevOps platform if the result of the authentication process is not inline with the policy defined within the code authentication element.

4. The method as claimed in claim 1, wherein the processor interfaces with the DevOps platform via a queuing channel to retrieve information associated with occurrence of one or more events in respective one or more tools of the DevOps platform.

5. The method as claimed in claim 4, wherein the queuing channel may be selected from a group of message queue tools such as RabbitMQ.

6. The method as claimed in claim 4, wherein the retrieved information associated with occurrence of one or more events in respective one or more tools of the DevOps platform is parsed to extract event type data.

7. The method as claimed in claim 1, wherein each of the one or more code authentication elements is representative of an authentication process and an action to be executed within corresponding tools of DevOps platform after the authentication process.

8. The method as claimed in claim 1, wherein each policy defined within corresponding code authentication element is representative of a set of conditions which should be attained for success of the authentication process.

9. The method as claimed in claim 1, wherein mapping a code authentication element with the one or more event types occurring in the respective one or more tools of the DevOps platform comprises mapping a policy within corresponding code authentication element with a specific event type, wherein the code authentication element is executed on occurrence of the one or more event types and the policy within the code authentication element is executed to authenticate corresponding event type.

10. The method as claimed in claim 2, wherein the result of the authentication process and the software code transition is stored in the distributed ledger for querying and auditing.

11. The method as claimed in claim 1, wherein the distributed ledger is a blockchain ledger.

12. A system for tracking and authenticating software code transition during one or more phases of software development and deployment in a DevOps platform, wherein the system interfaces with the DevOps platform and one or more terminal devices, the system comprising:

a memory storing program instructions; and a processor configured to execute program instructions stored in the memory; and an application delivery engine in communication with the processor and configured to:

create, modify and delete, one or more code authentication elements within a distributed ledger;

map the one or more created or modified code authentication elements with one or more event types occurring in respective one or more tools of the DevOps platform to create an event-contract database;

extract an event type data from information associated with occurrence of an event in a tool of the DevOps platform;

determine a code authentication element associated with the extracted event type from the one or more code authentication elements within the distributed ledger based on the mapping of the one or more code authentication elements with the one or more event types associated with one or more tools of the DevOps platform stored in an event-contract database;

invoke the determined code authentication element to authenticate transition of a software code associated with the extracted event type to an appropriate tool of the DevOps platform; and execute software code transition based on the result of the authentication.

13. The system as claimed in claim 12, wherein the software code transition to the appropriate tool of the DevOps platform is executed if the result of the authentication process is inline with the defined policy.

14. The system as claimed in claim 13, wherein the software code transition is prevented to the appropriate tool of the DevOps platform if the result of the authentication process is not inline with the policy defined within the code authentication element.

15. The system as claimed in claim 12, wherein the application delivery engine comprises a data collection unit in communication with the processor and said data collection unit is configured to interface with the DevOps platform to retrieve information associated with occurrence of one or more events in respective one or more tools of the DevOps platform.

16. The system as claimed in claim 15, wherein the data collection unit interfaces with the DevOps platform via a queuing channel to retrieve information associated with occurrence of one or more events in respective one or more tools of the DevOps platform, where the queuing channel may be selected from a group of message queue tools such as RabbitMQ.

17. The system as claimed in claim 15, wherein the retrieved information associated with occurrence of one or more events in respective one or more tools of the DevOps platform is parsed to extract event type data.

18. The system as claimed in claim 12, wherein each of the one or more code authentication elements is representative of an authentication process and an action to be executed within corresponding tools of DevOps platform after the authentication process.

19. The system as claimed in claim 12, wherein each policy defined within corresponding code authentication element is representative of a set of conditions which should be attained for success of the authentication process.

20. The system as claimed in claim 12, wherein mapping a code authentication element with the one or more event types occurring in the respective one or more tools of the DevOps platform comprises mapping a policy within corresponding code authentication element with a specific event type, wherein further the code authentication element is executed on occurrence of the one or more event types and the policy within the code authentication element is executed to authenticate corresponding event type.

21. The system as claimed in claim 12, wherein the application delivery engine comprises an event interpretation unit in communication with the processor, said event interpretation unit configured to determine the code authentication element to be invoked from the event-contract database based on the extracted event type data.

22. The system as claimed in claim 12, wherein the application delivery engine comprises a tracking and auditing unit in communication with the processor, said tracking and auditing unit configured to audit and track authentication results and the software code transition stored in the distributed ledger based on one or more parameters.

23. The system as claimed in claim 22, wherein the one or more parameters include time period, event type, DevOps tool name or phase of software development and deployment, and artifacts.

24. The system as claimed in claim 13, wherein the result of authentication process and the software code transition are stored in the distributed ledger for querying and auditing.

25. The system as claimed in claim 12, wherein the distributed ledger is a blockchain ledger.

26. A computer program product comprising:
a non-transitory computer-readable medium having computer-readable program code stored thereon, the computer-readable program code comprising instructions that, when executed by a processor, cause the processor to:
create, modify and delete one or more code authentication elements within a distributed ledger;
mapping the one or more created or modified code authentication elements with one or more event types occurring in respective one or more tools of the DevOps platform to create an event-contract database;
extract an event type data from the information associated with occurrence of an event in a tool of the DevOps platform;
determine a code authentication element associated with the extracted event type from the one or more code authentication elements within the distributed ledger based on the mapping of the one or more code authentication elements with the one or more event types associated with the one or more tools of the DevOps platform stored in the event-contract database;
invoke the determined code authentication element to authenticate transition of a software code associated with the extracted event type to an appropriate tool of the DevOps platform; and
execute software code transition based on the result of the authentication.

27. The computer program product as claimed in claim 26, wherein the software code transition to the appropriate tool of the DevOps platform is executed if a result of an authentication process is inline with a policy defined within the code authentication element.

28. The computer program product as claimed in claim 27, wherein the software code transition is prevented to the appropriate tool of the DevOps platform if the result of the authentication process is not inline with the policy defined within the code authentication element.

* * * * *